United States Patent [19]
Griesinger

[11] 3,735,018
[45] May 22, 1973

[54] SUPERCOOLED ELECTRIC CABLE

[75] Inventor: Wolfram Griesinger, Ottobrunn, Germany

[73] Assignee: Kabel-und Metallwerke Gutenhoffnugshutte Aktiengesellschaft, Hannover, Germany

[22] Filed: Aug. 30, 1971

[21] Appl. No.: 175,937

[30] Foreign Application Priority Data

Sept. 2, 1970  Germany..................P 20 43 451.1

[52] U.S. Cl..............174/28, 174/15 C, 174/102 D, 174/DIG. 6
[51] Int. Cl..........................H01b 9/04, H01v 11/00
[58] Field of Search.....................174/28, 29, 15 C, 174/16 B, 99 B, 102 D, DIG. 6

[56] References Cited

UNITED STATES PATENTS 3,562,401  2/1971  Long...................................174/15 C
3,595,982  7/1971  Kafka................................174/28 X

FOREIGN PATENTS OR APPLICATIONS 547,690  9/1942  Great Britain..........................174/28
438,065  11/1935  Great Britain..........................174/28
554,747  4/1943  Great Britain..........................174/28

*Primary Examiner*—Bernard A. Gilheany
*Assistant Examiner*—A. T. Grimley
*Attorney*—Philip G. Hilbert

[57] ABSTRACT

A supercooled electric cable having a conductor element centrally disposed within a tubular sheath for passing a coolant such as liquid helium therethrough, spacer elements being provided for locating the conductor element relative to the tubular sheath; the spacer elements being of a configuration such as to maintain the conductor element in a selected position relative to the sheath during the installation of the cable as well as at operating temperatures.

8 Claims, 2 Drawing Figures

PATENTED MAY 22 1973

3,735,018

INVENTOR.
Wolfram Griesinger

BY Philip S. Hilbert

ATTORNEY

SUPERCOOLED ELECTRIC CABLE

BACKGROUND OF THE INVENTION

Supercooled cables comprising conductor elements arranged within a tubular sheath which is filled with a coolant such as liquid helium or the like, are known in the art for transmitting electrical energy. Insulation of the cable for controlling thermal gradients is usually provided in the form of concentric tubular members arranged about the innermost tubular member carrying the superconductive element.

The tubular members may be transversely corrugated. The successive annular spaces between the concentric tubular members may be evacuated to produce a vacuum; filled with liquid nitrogen; and evacuated, in sequence; thereby obtaining a desired thermal gradient. In such cables, the conductor element may comprise a pair of concentric carrier members in which the facing surfaces thereof are provided with a superconducting layer.

It is also known in the art to replace a single conductor element of relatively large cross section, with a plurality of conductor elements of reduced cross section; the elements being connected electrically in parallel. The superconducting materials known in the art include lead, niobium and niobium alloys.

The conducting element of such cables can consist entirely of the superconductive material; or since energy transmission occurs in a thin layer at a surface portion of the element, for example through skin effect; a core member of other metallic or synthetic resin material can be covered with a thin layer of the superconductive material. Such thin layer may be produced by electrolytic deposition, vacuum evaporation or by covering the core member with a thin tape of the superconductive material and welding the adjacent edges thereof.

For locating and centering the conductor element within the innermost tubular member of the cable, various spacer means have been suggested. One such spacer means comprises a helically disposed strip having radially extending, spaced stem portions. As a result of the temperature gradient directed from the inside to the outside, such helical spacers form an uninterrupted heat conducting bridge between concentric tubular members.

Further with known spacer constructions, during operation of the cable, difficulties have been encountered due to differing coefficients of thermal expansion of the conductor elements, the tubular member and the supporting spacer which is usually formed of synthetic resins. Very little has been done to compensate for such differing expansion coefficients.

Accordingly, an object of this invention is to provide an improved superconducting cable including a superconductive element disposed within a tubular member; spacer means for maintaining the relative position of the superconductive element and the tubular member, during fabrication thereof; transport of the same, installation thereof; and above all, during operation of the cable.

Another object of this invention is to provide in a cable of the character described, spacer means of low heat conductivity and a structure which minimizes heat transfer; such spacer means being arranged at spaced intervals along the length of the cable and adapted to locate the superconductive element thereof in a predetermined relationship to the axis of the cable as a whole.

Still another object of this invention is to provide in a cable of the character described, spacer means for maintaining the superconductive element in a fixed relationship to the innermost tubular member of the cable; yet providing compensating means for forces arising in the element through thermal contraction.

Yet another object of this invention is to provide in a cable of the character described, spacer means comprising disc members of part circular form having openings or slots for receiving the superconductive element; such slots being located so that the superconductive element will be eccentrically related to the longitudinal axis of the cable.

Other objects of this invention will in part be obvious and in part hereinafter pointed out.

DESCRIPTION OF THE PREFERRED EMBODIMENT

The supercooled electric cable of the instant invention comprises a superconductive element disposed generally centrally within a tubular member which may be the innermost of a plurality of concentric tubular members providing successive annular spaces which may be evacuated and/or filled with liquid nitrogen, to provide heat insulating means.

Figure 1:
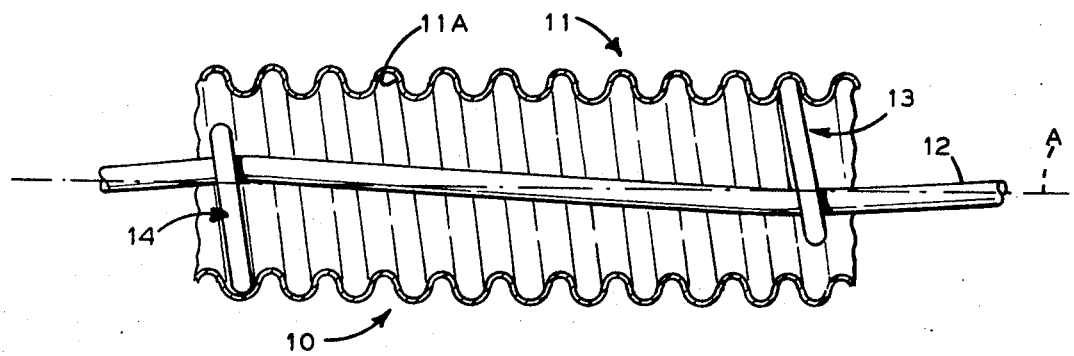
FIG. 1 is a longitudinal sectional view showing a supercooled electric cable embodying the invention.
Figure 2:
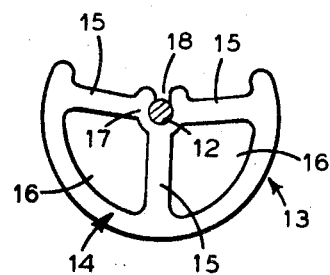
FIG. 2 is a plan view showing the spacer element and superconductive element in association therewith and forming part of the cable.

Thus, as indicated in FIG. 1, a supercooled cable 10 comprises a corrugated tubular member 11 and a superconductive element 12 disposed within the tubular member 11. Liquid helium or other suitable coolant flows through tubular member 11 for contacting superconductive element 12.

To properly locate superconductive element 12 within tubular member 11, spacer means is provided as generally indicated at 13. Spacer means 13 takes the form of a part circular disclike member which may be formed of molded synthetic resin such as polyurethane, polymethycrylic ester, polyphenylene or the like.

Spacer member 13 comprises a part circular rib portion 14 with a set of three inwardly extending radial portions forming arms 15 and defining spaces 16 therebetween. The inner ends of arms 15 merge with a small hub portion 17 formed with an open end slot 18. The rib portion 14 has a circumferential extent somewhat greater than 180°.

The slot 18 is adapted to receive superconductive element 12, said slot being slightly smaller then the element 12 so that the element 12 may be snapped into slot 18 and tightly held therein. The spacer members 13 are adapted to be mounted on element 12 at spaced longitudinal intervals; the rib portions 14 being received in the helical grooves 11A of tubular member 11. The spacer member 13 has its opposed portions displaced in opposite directions from a central plane, so as to seat properly in grooves 11A.

Further, the slots 18 in spacer member 13 are located in a manner such that upon assembly of the conductive element 12, spacer member 13 and tubular member 11; the axis of said conductive element 12 will be offset with respect to the longitudinal axis indicated at A of the tubular member 11.

Also, as shown in FIG. 1, successive spacer members 13 are turned in 180° relationship to each other. This causes successive portions of element 12 to be slightly above and below the axis A of tubular member 11, where such portions are engaged by spacer members 13. The intermediate portions of element 12 are in inclined relation to axis A.

Thus, the element 12 is rigidly maintained in its relationship to tubular member 11, during fabrication, transportation and installation. Further, with calculated spacing of the slots 18 in spacer members 13 relative to cable axis A, and selected spacing between spacer members 13; contraction of the members 13 and of the conductive element 12 equalize at operating temperatures, at which time the element 12 is substantially coincident with the cable axis A; thereby avoiding tension in respect to terminal portions of the cable or radial forces in bends of cable 10.

It is understood that spacer members 13 are correlated to the helical groove portions of member 11, so as to provide a proper fit therebetween, and the outer edge of rib 14 will then be a partial turn of helical shape. In assembling the spacer members and conductive element, it has been found that at the newly formed initial portions of the cable, the spacer members 13 may have a closer spacing then the normal spacing along the major portions of the cable. This insures proper positioning of the assembly of conductive element 12 and spacer members 13 in tubular member 11.

It is further understood that the single conductive element 12, which includes in whole or in part, the superconductive materials, such as lead, niobium or niobium alloys; may be replace by a plurality of conductive elements, with appropriate modification of spacer members. Cable 10 may also be readily wound and unwound in respect to drums, without disturbing the relative position of the conductive element 12 and tubular member 11. It is understood that tubular member 11 may be provided with additional tubular members in concentric relation, to supply proper heat insulation.

I claim:

1. A supercooled electric cable comprising an elongated superconductive element, a tubular member and spacer means for locating said element within said tubular member, said spacer means comprising a disc member having a peripheral portion engageable with an inner surface portion of said tubular member and a hub portion formed with a slot for receiving and engaging a portion of said superconductive element, the slot in said disc member being located to dispose the engaged portion of said superconductive element in eccentric relation to the longitudinal axis of said tubular member.

2. A cable as in claim 1, wherein said disc member comprises a part circular circumferential rib portion and radial arm portions connecting said rib portion with said hub portion.

3. A cable as in claim 2, wherein said tubular member is helically corrugated, the rib portion of said disc member being received in a helical groove portion of said tubular member.

4. A cable as in claim 1 wherein said spacer means comprises a plurality of longitudinally spaced disc members, the engaged portions of the superconductive element in successive disc members being respectively on opposite sides of the longitudinal axis of said tubular member.

5. A cable as in claim 1 wherein said slot is slightly smaller then the cross section of said superconductive element whereby said element has a snap fit in said slot.

6. A cable as in claim 1 wherein said spacer member is formed of a synthetic resin of low heat conductivity.

7. A cable as in claim 2, wherein said circumferential rib portion has a circumferential extent somewhat greater then 180°.

8. A cable as in claim 4, wherein the slots in successive disc members are in displaced relationship by an angle of about 180°.

* * * * *